United States Patent [19]
Adler et al.

[11] Patent Number: 5,193,917
[45] Date of Patent: Mar. 16, 1993

[54] ROLLING BEARINGS FOR STEERING COLUMNS

[75] Inventors: Hellmut Adler; Alexander Zernickel, both of Herzogenaurach, Fed. Rep. of Germany

[73] Assignee: INA Walzlager Schaeffler KG, DEX

[21] Appl. No.: 876,477

[22] Filed: Apr. 30, 1992

[30] Foreign Application Priority Data
May 4, 1991 [DE] Fed. Rep. of Germany ....... 4114643

[51] Int. Cl.$^5$ ............................................. F16C 27/06
[52] U.S. Cl. .................................. 384/517; 384/536; 384/539
[58] Field of Search ............... 384/499, 500, 513–518, 384/535, 536, 539, 581, 582, 563, 585, 611, 612; 74/492; 280/779, 780

[56] References Cited

U.S. PATENT DOCUMENTS
| | | | |
|---|---|---|---|
| 2,018,027 | 10/1935 | Marles | 384/518 |
| 2,509,587 | 5/1950 | Creson | 384/518 |
| 5,102,241 | 4/1992 | Pflungner | 384/499 |

FOREIGN PATENT DOCUMENTS
| | | | |
|---|---|---|---|
| 3808556 | 9/1989 | Fed. Rep. of Germany . | |
| 2058955 | 4/1981 | United Kingdom | 384/536 |

*Primary Examiner*—Thomas R. Hannon
*Attorney, Agent, or Firm*—Bierman and Muserlian

[57] ABSTRACT

A rolling bearing, in particular for steering columns of automotive vehicles, comprising rolling elements in the form of balls arranged between an inner ring and another ring, and a tolerance ring made of a polymeric material which is at least partially surrounded by the inner ring and is pressed axially against the inner ring in the direction of the balls by a spring, characterized in that the spring (7, 17) is made of a polymeric material.

4 Claims, 2 Drawing Sheets

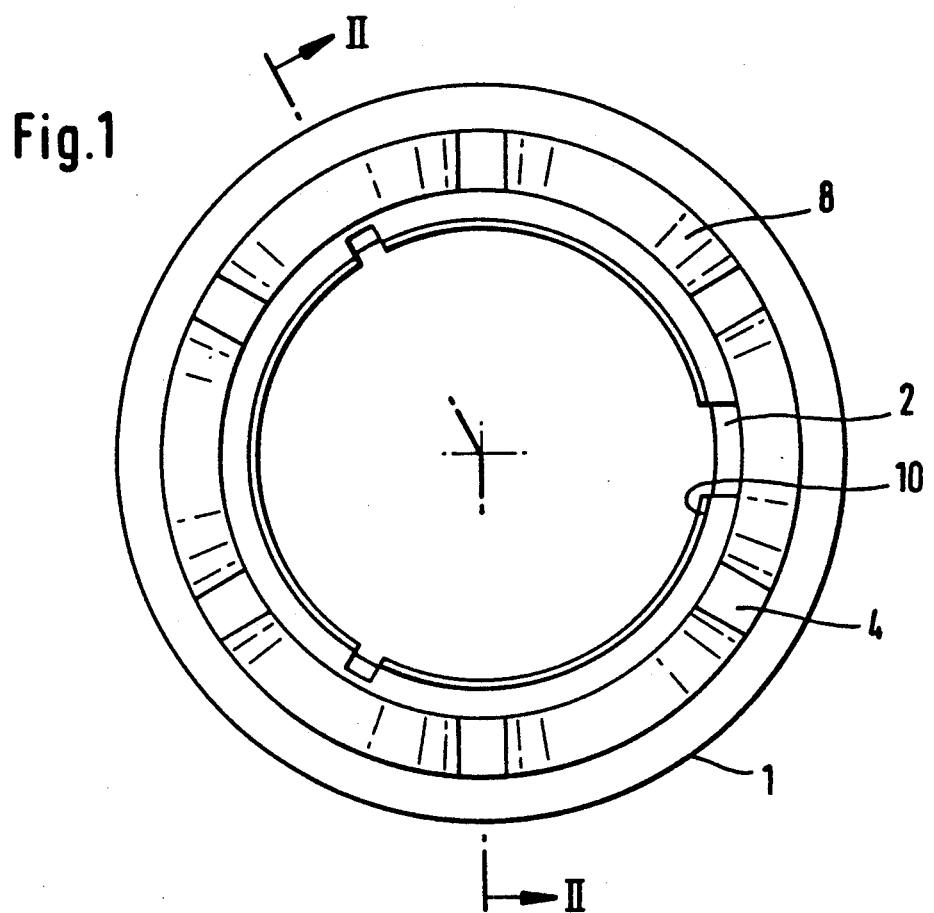
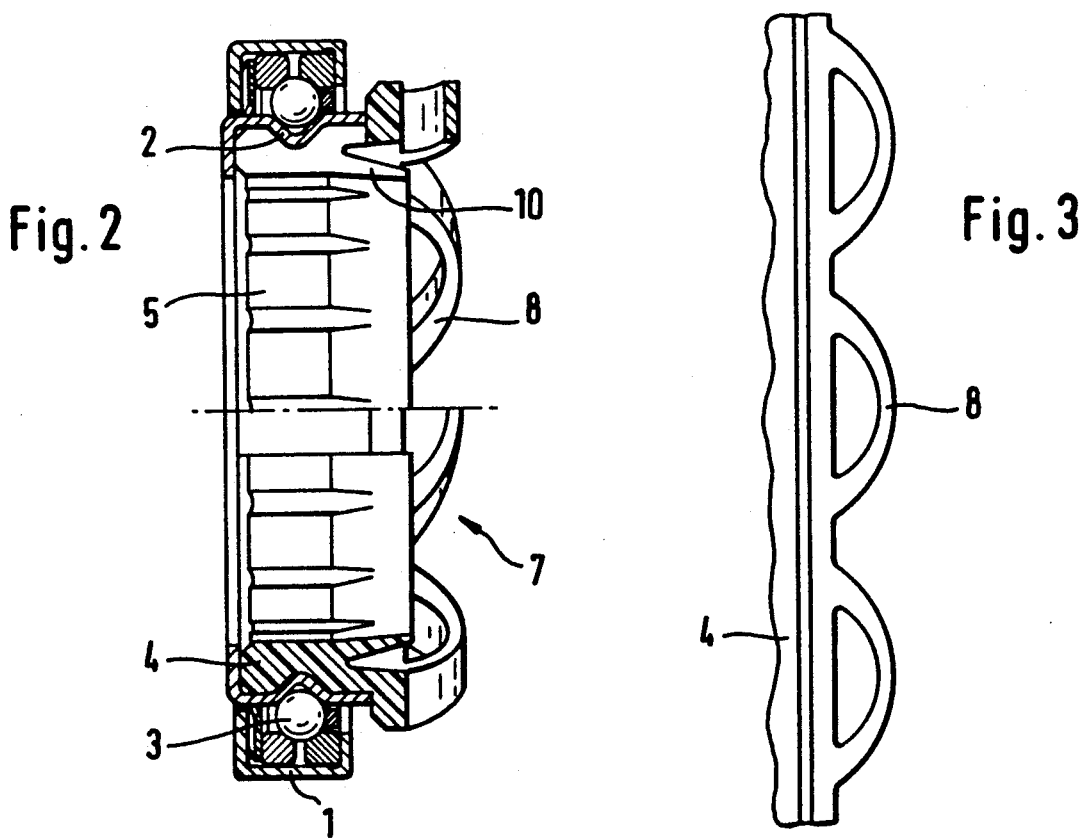

ROLLING BEARINGS FOR STEERING COLUMNS

STATE OF THE ART

Rolling bearings, particularly for steering columns of automotive vehicles, comprising rolling elements in the form of balls arranged between an inner ring and an outer ring, and a tolerance ring made of a polymeric material which is at least partially surrounded by the inner ring and is pressed axially against the inner ring in the direction of the balls by a spring are known from DE-OS 3,808,556. This rolling bearing comprises axially protruding retaining regions on its tolerance ring which are provided for retaining several functional rings which they surround and behind which they engage by means of retaining lugs. These functional rings are made of a contact disc, a spring ring and a locking disc by means of which locking disc, the spring ring is supported on the steering column. This spring made in the form of a metallic spring ring exerts the axial force on the tolerance ring and, via the inner ring, on the balls. At the other axial end of this bearing, the tolerance ring comprises retaining lugs having radial projections which engage behind the outer ring. In this way, a ready-to-mount structural unit comprising the rolling bearing as well as the functional rings is obtained.

OBJECTS OF THE INVENTION

It is an object of the invention to simplify the rolling bearing so that a metallic spring and additional supporting elements such as contact discs in the form of separate components are no longer required.

This and other objects and advantages of the invention will become obvious from the following detailed description.

THE INVENTION

The novel rolling bearing of the invention comprising rolling elements in the form of balls arranged between an inner ring and an outer ring, and a tolerance ring made of a polymeric material which is at least partially surrounded by the inner ring and is pressed axially against the inner ring in the direction of the balls by a spring, is characterized in that the spring (7, 17) is made of a polymeric material. Thus, a ready-to-mount structural unit is obtained consisting of the rolling bearing with an integrated plastic spring for compensating tolerances in the steering column and for producing the required pre-tension. A separate spring, for example a metallic disc spring, for the axial bridging of play and for the support of the bearing is therefore no longer required. In an advantageous manner, the spring can be made of the same polymeric material as the tolerance ring and in one piece with this.

The spring of polymeric material can be made of several axially outwards vaulted bow-shaped ribs arranged behind one another in the peripheral direction on one end face of the tolerance ring. In this way, a structurally simple one-piece component of polymeric material comprising the tolerance ring and the spring is obtained.

The tolerance ring can be several segment-shaped radially elastic projections extending into the bore of the tolerance ring and this design permits a simple pushing-on of the rolling bearing assembly onto the steering column. The fixing of the rolling bearing on the steering column in one axial direction is achieved by the fact that the elastic projections lock into recesses of the steering column or steering axle where they are supported on supporting surfaces.

REFERRING NOW TO THE DRAWINGS

FIG. 1 is a top view of the end face of a rolling bearing which comprises the spring elements;

FIG. 2 is an axial section through the bearing of FIG. 1 along line II—II;

FIG. 3 is a developed view of the spring region of the bearing of FIG. 2;

Figure 4:
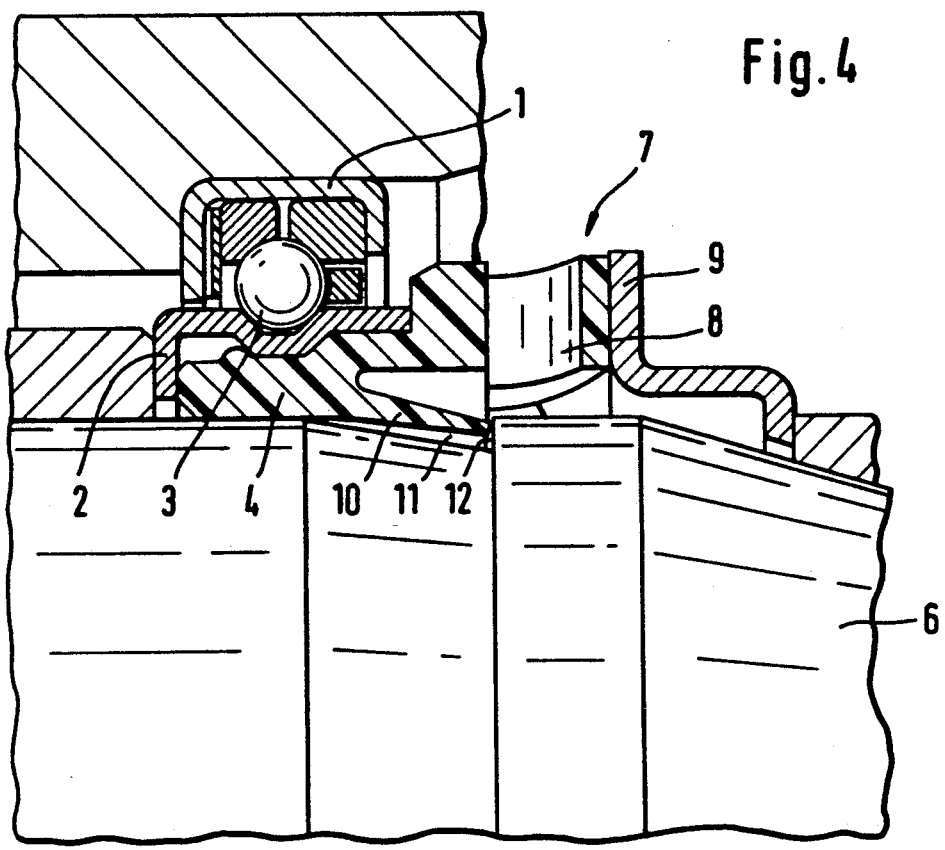
FIG. 4 is an enlarged partial view of the bearing mounted on a steering column.

The bearing of FIGS. 1 to 4 comprises a split outer ring 1 with a spring, an inner ring 2, rolling elements in the form of balls 3 arranged between these rings and a tolerance ring 4 made of polymeric material which is situated adjacent to the inner ring 2 on the inside and comprises an axial bore 5 by which it can be pushed onto a steering axle 6. A spring 7 made of the same polymeric material as the tolerance ring 4 and in one piece with it, is situated adjacent to one end face of the tolerance ring 4. Several ribs 8 arranged behind one another in the peripheral direction serve as spring elements. They are vaulted axially outwards and deform elastically when an axial force is exerted on the blocked rolling bearing via a contact ring 9.

To axially secure this rolling bearing assembly after it has been pushed onto the steering axle 6 so that it cannot be pushed back, the tolerance ring 4 comprises several radially elastic projections 10 which extend into the region of the bore 5 of the tolerance ring 4. These projections 10 can lock into recesses 11 of the steering axle 6 and can be supported in the recesses 11 on supporting surfaces 12 which are situated preferably in planes extending at right angles to the axis of the steering axle.

Figure 6:
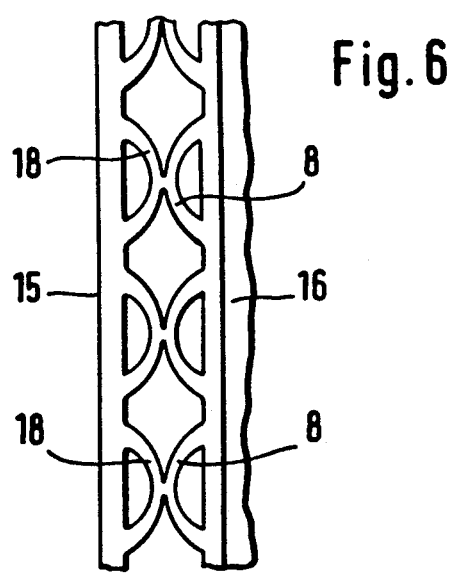
FIG. 6 is a developed view of the spring region of the bearing of FIG. 5.
Figure 5:
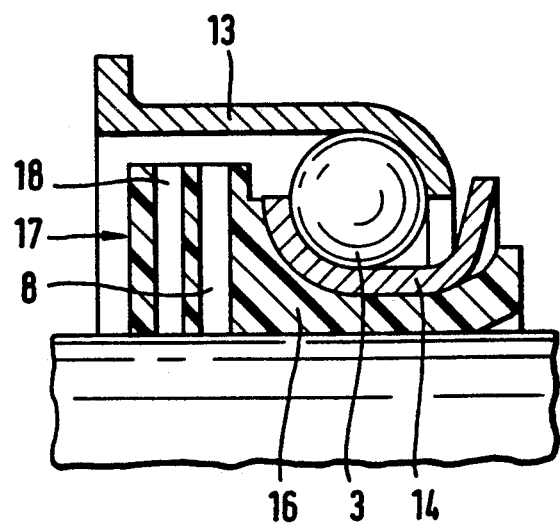
FIG. 5 is another embodiment of a rolling bearing of the invention in axial section.

The rolling bearing of FIGS. 5 and 6 with its outer ring 13, its inner ring 14 and the balls 3 comprises a tolerance ring 16 whose integrally formed spring 17 is composed of two plastic rings with ribs 8 and 18. The ribs 8 and 18 are vaulted towards each other in such a way that each rib 8 touches a rib 18 at a point of periphery situated in the mid-plane of the spring. As a result, the spring 17 has a flat contact face 15 on the outer side of the rolling bearing assembly.

The springs 7 and 17 of the bearing of the invention assure a play-free guidance of the rolling elements and at the same time they compensate length tolerances in the steering column. Since these springs are made in one piece with the tolerance rings 4 and 16 respectively, a structural simplification of the rolling bearing assembly unit is obtained. Separate spring rings of steel and their supporting elements are no longer required in such rolling bearing assembly units.

Various modifications of the bearings of the invention may be made without departing from the spirit or scope thereof and it is to be understood that the invention is intended to be limited only as defined in the appended claims.

What we claim is:

1. A rolling bearing, in particular for steering columns of automotive vehicles, comprising rolling elements in the form of balls (3) arranged between an inner ring (2,14) and an outer ring (1,13), and a tolerance ring (4,16) of a polymeric material which is at least partially surrounded by the inner ring (2,14) and is pressed axially against the inner ring (2,14) in the direction of the balls (3) by a spring (7,17) characterized in that the spring (7,17) is made of a polymeric material as a one-piece component with the tolerance ring (4,16).

2. A rolling bearing of claim 1 wherein the spring (7,17) is made of the same polymeric material as the tolerance ring (4,16).

3. A rolling bearing of claim 1 wherein the spring (7) is constituted by several axially outward vaulted bow-shaped ribs (8) arranged behind one another in the peripheral direction on one end face of the tolerance ring (4).

4. A rolling bearing of claim 1 wherein the tolerance ring (4) comprises several segment-shaped radially elastic projections (10) which extend into the bore (5) of the tolerance ring (4).

* * * * *